United States Patent [19]

McClellan

[11] 4,121,800

[45] Oct. 24, 1978

[54] SUPPORTING BRACKET FOR DRINKING WATER CONTAINERS

[76] Inventor: Edward L. McClellan, 2302 Oak St., Santa Monica, Calif. 90405

[21] Appl. No.: 864,660

[22] Filed: Dec. 27, 1977

[51] Int. Cl.² ............................................. A47F 5/00
[52] U.S. Cl. .................................. 248/207; 248/301; 248/311.1 R
[58] Field of Search .................. 248/205 R, 207, 301, 248/304, 309 R, 311.1, 518, 535, DIG. 7

[56] References Cited

U.S. PATENT DOCUMENTS

| 2,176,352 | 10/1939 | McHuron | 248/518 |
| 2,286,118 | 6/1942 | Sleeth | 248/301 UX |
| 2,304,967 | 12/1942 | Tiryakian | 248/304 |
| 3,564,753 | 2/1971 | Fravel | 248/538 |

FOREIGN PATENT DOCUMENTS 934 of 1913 United Kingdom ..................... 248/301

*Primary Examiner*—William H. Schultz
*Attorney, Agent, or Firm*—Ralph B. Pastoriza

[57] ABSTRACT

The bracket is designed to support a drinking water container either to the underside of a cabinet or to the side wall of the cabinet in a convenient position for dispensing water from the container into a drinking glass. The bracket itself is made up of two plate members and a cooperating rod. The arrangement is such that a first one of the plate members may be secured directly to the underside of a cabinet to support a drinking container at this location. Alternatively, the first plate member may be secured to the side wall of a cabinet by way of the second plate member for supporting the drinking container in this particular location. In either location, the cooperating rod member is arranged to pass over the top of the handle of the container supported in the first plate member to secure or lock the container to the bracket and thus avoid accidental dislodgement.

3 Claims, 5 Drawing Figures

SUPPORTING BRACKET FOR DRINKING WATER CONTAINERS

This invention relates generally to brackets and more particularly to a specific type of bracket hardware for supporting drinking water containers generally of 2½ gallon capacity in convenient locations for dispensing water into drinking glasses.

BACKGROUND OF THE INVENTION

It is common practice to provide purified drinking water to both business offices and homes. In the case of business establishments, the water is normally supplied in large bottles arranged to be inverted into appropriate water coolers for use by a large number of employees. In the case of homes or residences the drinking water is often supplied in large plastic containers either by way of delivery or as a shelf item in supermarkets. The use of plastic containers for drinking water in homes or residences rather than the conventional commercially supplied bottled water with cooperating coolers is twofold. First, less water is normally required for home use and thus a plastic container becomes practical and may be so designed with an integral carrying handle that it is easy to handle by persons in the home. Second, the use of a plastic container avoids the risk of breaking and further provides a plastic type container which can be used after the water has been exhausted for other purposes such as flower planters and the like. In the case of business offices, the delivery person normally replaces the bottled water and is trained in this particular art.

While the plastic water containers have proved very successful, there is still presented the problem of exactly where to place the water container for convenient use in the home. While the container may simply rest on a counter or even be placed in a refrigerator, in both instances it uses up valuable space.

BRIEF DESCRIPTION OF THE PRESENT INVENTION

Bearing the foregoing in mind, the present invention contemplates the provision of a unique bracket structure particularly designed for the support of plastic type drinking water containers used in homes to the end that the container will always be positioned for convenient use and yet will not take up valuable counter space or other useful areas in the kitchen.

More particularly, the bracket of this invention is designed to support the drinking water container either to the underside of a kitchen cabinet or to the side wall of the cabinet at the option of the user. Towards this end, the bracket includes first and second plate members and a cooperating rod together with appropriate fastening screws. The first plate member defines a U-shaped cradle for receiving the handle of the drinking water container and is so designed that it may be secured directly to the underside of the kitchen cabinet, the cooperating rod being designed to pass over the top of the handle when in the U-shaped cradle to secure the drinking container in its suspended position. Alternatively, the first plate member may be secured to the side wall of a cabinet by means of the second plate member, the same screw fastening holes for securing the first plate member to the underside of the cabinet being utilized to secure it to the second plate member which in turn is secured to the side of the cabinet. The same rod member can be utilized to effectively lock the handle of the drinking container in place when positioned in the U-shaped cradle.

Certain single portions of the bracket structure thus serve dual functions resulting in an economy of manufacture of the bracket.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
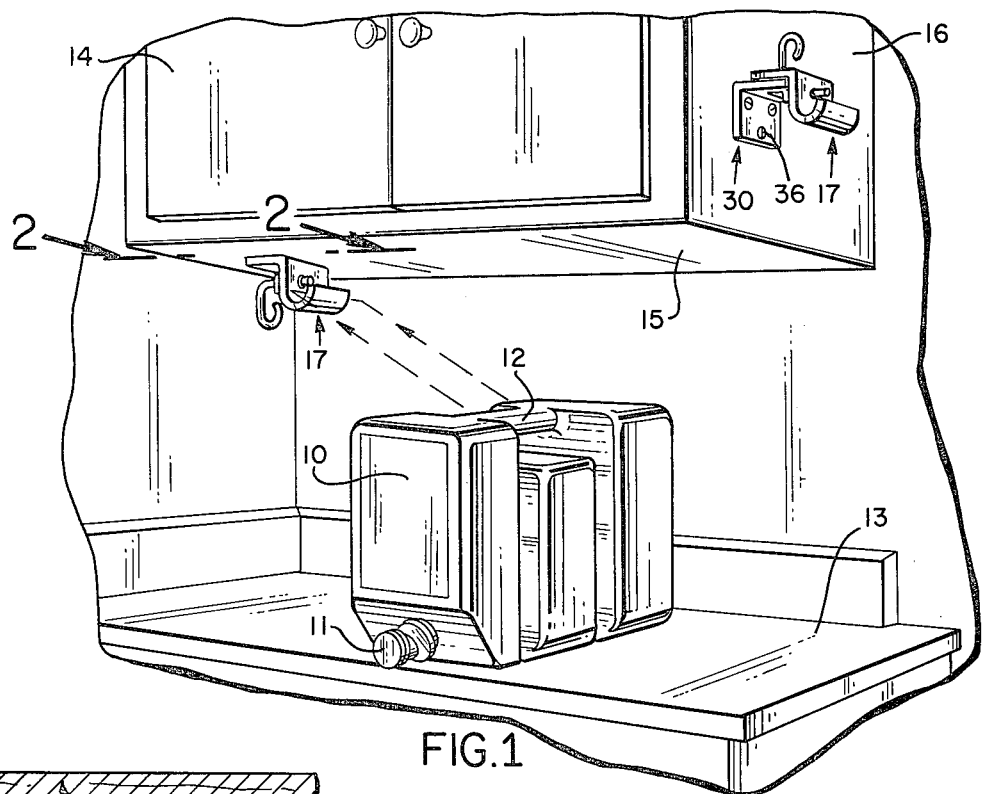
FIG. 1 is a fragmentary perspective view of a portion of a kitchen cabinet wherein the bracket of this invention is illustrated in both its under cabinet location and side wall cabinet location.

Referring first to FIG. 1, there is shown a plastic type drinking water container 10 having a drinking water dispensing spout 11 and a carrying handle 12. While the plastic container 10 is of a particular configuration shown in FIG. 1, it will be understood that the bracket of this invention can be used to support any type of drinking water container provided the same has a carrying handle corresponding essentially to that indicated at 12.

In FIG. 1, the container 10 is shown resting on top of a counter 13 in a typical residential kitchen. Shown above the counter 13 is a cabinet structure 14 also typical of residential kitchens.

Figure 2:
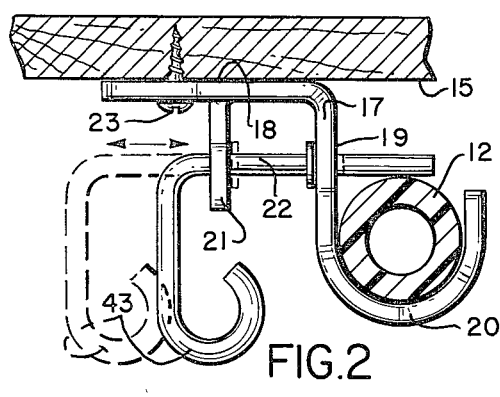
FIG. 2 is an enlarged cross section of a portion of the cabinet illustrating the bracket in side elevational view with the handle of a drinking water container supported thereby.

As described heretofore, the bracket of this invention is designed to support the drinking container 10 either to the underside 15 of the cabinet 14 or to a side wall 16 of the cabinet or, if desired, several of the brackets may be utilized to support more than one drinking water container in desired locations such as both to the underside of the cabinet and to the side wall of the cabinet. Normally, however, a single bracket will be provided and, at the option of the user, is designed to be secured either to the underside of the cabinet or to the side wall. In FIG. 2, two of the brackets are illustrated in both positions for convenience in describing the functional aspects of the bracket.

In either of the locations, the bracket includes a first plate member designated generally by the arrow 17 in FIG. 1.

Considering first the bracket for securing the container on the underside 15 of the cabinet 14, reference is had to FIG. 2 illustrating in greater detail the first plate member 17. As shown in FIG. 2, this plate member has a flat horizontal section 18 merging into a downwardly extending vertical section 19 and thence into an outwardly and upwardly extending curved section 20 defining a U-shaped cradle. In FIG. 2, the handle 12 is shown positioned in this cradle for supporting the drinking container 10 of FIG. 1.

The flat horizontal section 18, as will become clearer as the description proceeds, has parallel spaced cuts extending inwardly from one edge and terminating in the central portion of the flat section. The portion of the section between the cuts is bent downwardly to define a tongue 21 generally parallel to and spaced from the downwardly extending vertical section 19. This tongue and vertical section are provided with aligned bores for receiving a rod member 22 arranged to slide back and forth in the bores to pass across the top of the U-shaped cradle and thereby hold the handle 12 in position.

The flat horizontal section 18 of the first bracket member as shown in FIG. 2 is provided with first and second screw holes for receiving fastening screws such as indicated at 23 to enable securement of this flat section to the underside 15 of the cabinet. It will be evident from the phantom line showing of the rod member 22 that the same may be retracted to permit easy insertion or removal of the handle 12 of the container into or from the U-shaped cradle 20.

Figure 3:
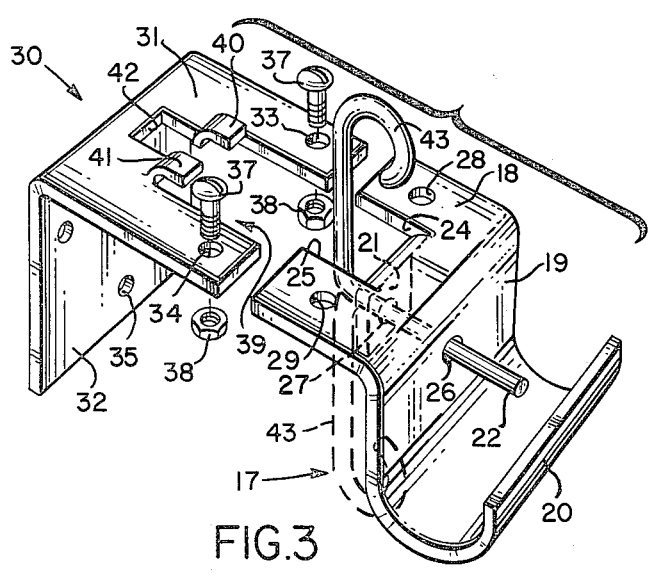
FIG. 3 is an exploded perspective view of the overall basic components making up the bracket of this invention.

FIG. 3 illustrates in greater detail the first plate member 17 described in FIG. 2 wherein the parallel cuts in the flat horizontal section are shown at 24 and 25 between which the downwardly bent tongue 21 is illustrated in phantom lines. Also shown in FIG. 3 are the aligned bores 26 and 27 in the downwardly extending vertical section 19 and tongue 21 respectively. Finally, the screw fastening holes 28 and 29 on the flat horizontal section 18 are illustrated.

FIG. 3 further illustrates a second plate member forming part of the bracket when the same is to be mounted to the side wall of a cabinet. This second plate member is designated generally by the arrow 30 and includes a flat horizontal section 31 merging into a downwardly extending vertical section 32 to define an inverted L-shape.

The first horizontal section of this second plate member has first and second screw holes 33 and 34 spaced to register with the first and second screw holes 28 and 29 on the flat horizontal section 18 of the first plate member. The downwardly extending vertical section 32 of the second plate member is provided with screw holes such as indicated at 35 for fastening screws such as indicated at 36 to secure it to the side wall of the cabinet.

The foregoing arrangement is such that the first plate member 17 of FIG. 3 can be supported to the side wall of a cabinet by means of the second plate member 30. In this respect, the fastening screw holes 28 and 29 in the flat horizontal section 18 of the first plate member will register with the holes 33 and 34 in the flat horizontal section of the second plate member when these sections are overlapped. Securement of the sections together is accomplished by bolts and nuts such as indicated at 37 and 38 in FIG. 3.

To assure a stable securement of the first plate member 17 to the second plate member 30, the flat horizontal section 31 of the second plate member includes a cut-out 39 extending between the first and second screw holes 33 and 34 from one edge to its central portion to pass under the parallel cuts 24 and 25 in the first plate member, the inner edge of this cut-out including raised tabs 40 and 41 positioned to overlie the edge of the horizontal section 18 of the first plate member.

In FIG. 3 it will be further noted that there is provided at the inner edge of the cut-out 39 a notch 42 of narrower dimensions than the cut-out opening up between the tabs 40 and 41. This notch 42 is designed to cooperate with an upturned portion 43 on the rod 22 which is illustrated in FIG. 3 as swung 180° from its position illustrated in FIGS. 1 and 2.

Figure 4:
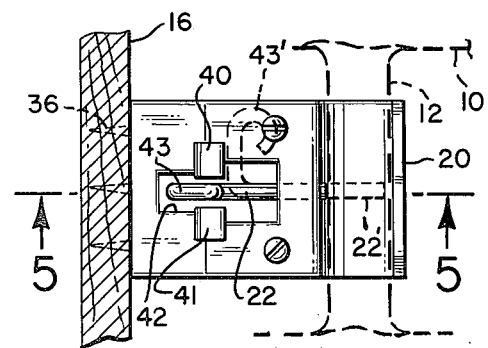
FIG. 4 is a top plan view of the bracket when secured to a side wall of the cabinet; and, FIG. 5 is a cross section of the bracket taken in the direction of the arrows 5—5 of FIG. 4.
Figure 5:
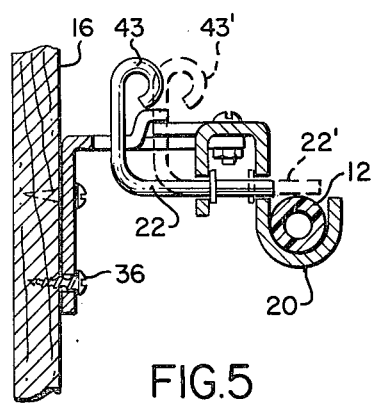

The foregoing cooperation of the first and second plate members with the rod when the bracket is utilized to support the drinking water container to the side wall of the cabinet will now be understood by referring to FIGS. 4 and 5.

Thus, in FIG. 4 the first and second plate members are shown assembled together with the upturned portion 43 of the rod member 22 received within the notch 42 when retracted from its position extending across the top of the U-shaped cradle. In the plan view of FIG. 4, the handle 12 of the drinking container is illustrated in phantom lines positioned in the cradle. After so positioning the container in the cradle the rod 22 is moved to the right as viewed in FIG. 4 to the phantom line position to overlie the top of the handle 12. The upturned portion 43 of the rod can then be tilted to the position illustrated at 43' to rest against the front portion of the tab 40 as illustrated. In this tilted position, the rod 22 is prevented from being retracted from its position extending across the top of the U-shaped cradle so that the handle 12 of the drinking container is held within the cradle.

When it is desired to release the handle 12, the upturned portion 43' of the rod member 22 is rotated slightly from its tilted position to a vertical position so that it can then be received in the notch 42 and retracted rearwardly to free the handle.

The foregoing is illustrated clearly in FIG. 5 wherein the solid line position of the upturned portion 43 is the retracted position to free the handle 12 whereas the effective locking position is illustrated by the phantom lines at 22' and 43'.

Also in FIG. 5, the securement of the fastening screws 36 to the side wall 16 of the cabinet for supporting the second bracket member thereto is clearly illustrated.

It will be understood that only the first plate member and rod are necessary when securing the drinking container 10 to the underside of a cabinet whereas both the first and second plate members and same rod are utilized in securing the drinking container to the side wall of the cabinet.

In either supported position, the drinking container is conveniently available for dispensing water into a drinking glass without taking up valuable counter space or other areas in the kitchen.

From all of the foregoing, it will be thus evident that the present invention has provided a unique and useful supporting bracket for plastic type drinking water containers readily adaptable to mounting either on an under-surface or a side surface of a cabinet or equivalent structure.

I claim:

1. A supporting bracket including, in combination:
   (a) a first plate member having a flat horizontal section merging into a downwardly extending vertical section and thence into an outwardly and upwardly extending curved section defining a U-shaped cradle, said flat horizontal section having parallel spaced cuts extending inwardly from one edge and terminating in the central portion of said flat section, the portion of said section between said cuts being bent downwardly to define a tongue generally parallel to and spaced from said downwardly extending vertical section, said tongue and vertical section having aligned bores therethrough and said flat horizontal section having first and second screw holes for receiving fastening screws so that it can be secured to the underside of a cabinet; and, (b) a rod member longitudinally slidable through said aligned bores in said tongue and vertical section to pass across the top of said U-shaped cradle whereby said rod can be retracted and the handle of a drinking water container placed in said U-shaped cradle and said rod then moved to overlie the top of said handle to retain it in said U-shaped cradle so that said drinking water container can be supported on the underside of said cabinet.

2. A supporting bracket according to claim 1, further including, in combination a second plate member having a flat horizontal section merging into a downwardly extending vertical section to define an inverted L-shaped, said flat horizontal section of said second plate member having first and second screw holes spaced to register with said first and second screw holes in said flat horizontal section of said first plate member, said downwardly extending vertical section of said second plate member having screw holes for receiving fastening screws to that it may be secured to a side wall of a cabinet; and bolt and nut means receivable through the registering screw holes in the flat horizontal sections of the first and second plate members when placed in overlapping relationship whereby said first plate member can alternately be secured on the side wall of a cabinet by said second plate member instead of being secured to the underside of said cabinet so that said drinking water container can be supported on the side wall of said cabinet.

3. A supporting bracket according to claim 2, in which said flat horizontal section of said second plate member includes a cut-out extending between said first and second screw holes from one edge to its central portion to overlie said parallel cuts in said horizontal section of said first plate member when the plates are secured together, the inner edge of said cut-out including raised tabs positioned to overlie the edge of said horizontal section of said first plate member to aid in securing the members together, said inner edge further including a notch of narrower dimensions than said cut-out positioned between said tabs, said rod member having a rearward upturned portion passing between said parallel cuts and cut-out in said first and second members respectively such that said upturned portion is receivable in said notch when said rod member is retracted and whereby said upturned portion can be tilted to rest against the front portion of one of said tabs after the rod is moved to pass across the top of said U-shaped cradle to thereby block rearward movement when in the tilted position so that the handle of said drinking water container may be effectively locked in said cradle by said rod member.

* * * * *